United States Patent
Kramer et al.

(10) Patent No.: US 9,003,876 B2
(45) Date of Patent: Apr. 14, 2015

(54) THERMAL MASS FLOWMETER WITH A METAL-ENCAPSULATED SENSOR SYSTEM

(75) Inventors: Axel Kramer, Wettingen (CH); Detlef Pape, Nussbaumen (CH); Kai Hencken, Lörrach (DE); Urs E. Meier, Würenlingen (CH)

(73) Assignee: ABB Technology AG, Zurich (CH)

( * ) Notice: Subject to any disclaimer, the term of this patent is extended or adjusted under 35 U.S.C. 154(b) by 732 days.

(21) Appl. No.: 13/097,829

(22) Filed: Apr. 29, 2011

(65) Prior Publication Data
US 2011/0283787 A1    Nov. 24, 2011

(30) Foreign Application Priority Data
Apr. 30, 2010    (DE) .................. 10 2010 018 947

(51) Int. Cl.
  *G01F 1/68* (2006.01)
  *G01F 1/692* (2006.01)
  *G01F 1/684* (2006.01)

(52) U.S. Cl.
  CPC .............. *G01F 1/692* (2013.01); *G01F 1/684* (2013.01)

(58) Field of Classification Search
  USPC ........................................ 73/204.22, 204.26
  See application file for complete search history.

(56) References Cited

U.S. PATENT DOCUMENTS

| | | | |
|---|---|---|---|
| 4,517,837 A | 5/1985 | Oyama et al. | |
| 5,880,365 A | 3/1999 | Olin et al. | |
| 6,588,268 B1* | 7/2003 | Yamagishi et al. | 73/204.26 |
| 6,681,624 B2* | 1/2004 | Furuki et al. | 73/204.13 |
| 7,058,532 B1* | 6/2006 | Yamagishi et al. | 702/100 |
| 7,587,938 B2 | 9/2009 | Tokuyasu et al. | |
| 7,650,783 B2* | 1/2010 | Pape et al. | 73/204.11 |
| 2003/0067960 A1* | 4/2003 | Nyffenegger et al. | 374/143 |
| 2009/0066353 A1 | 3/2009 | Devey et al. | |
| 2009/0282909 A1* | 11/2009 | Wienand et al. | 73/204.26 |
| 2009/0288481 A1 | 11/2009 | Urssens et al. | |

FOREIGN PATENT DOCUMENTS

| | | |
|---|---|---|
| DE | 29 14 275 A1 | 10/1979 |
| DE | 254 646 A1 | 3/1988 |
| DE | 199 39 942 A1 | 3/2001 |
| DE | 102 16 532 A1 | 10/2003 |
| DE | 10 2007 023 824 A1 | 11/2008 |
| EP | 1 835 267 A2 | 9/2007 |

* cited by examiner

*Primary Examiner* — Harshad R Patel
(74) *Attorney, Agent, or Firm* — Buchanan Ingersoll & Rooney PC

(57) ABSTRACT

A thermal mass flowmeter with a metal-encapsulated sensor system is provided. The sensor system included at least one heating resistor having a platelet geometry, and a sensor cap surrounding the at least one heating resistor. At least one distal end area of the sensor cap is formed with a flat rectangular cross section corresponding to the platelet geometry of the heating resistor, such that the distal end area of the sensor cap surrounds the heating resistor closely with an accurate fit (e.g., with a predetermined gap therebetween).

18 Claims, 2 Drawing Sheets

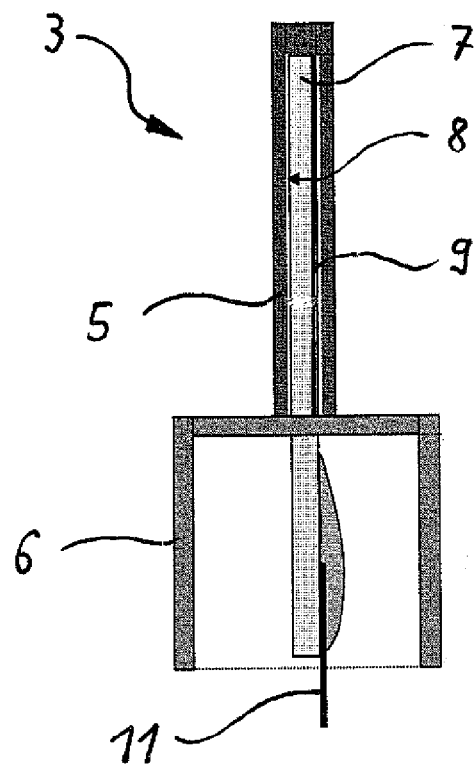
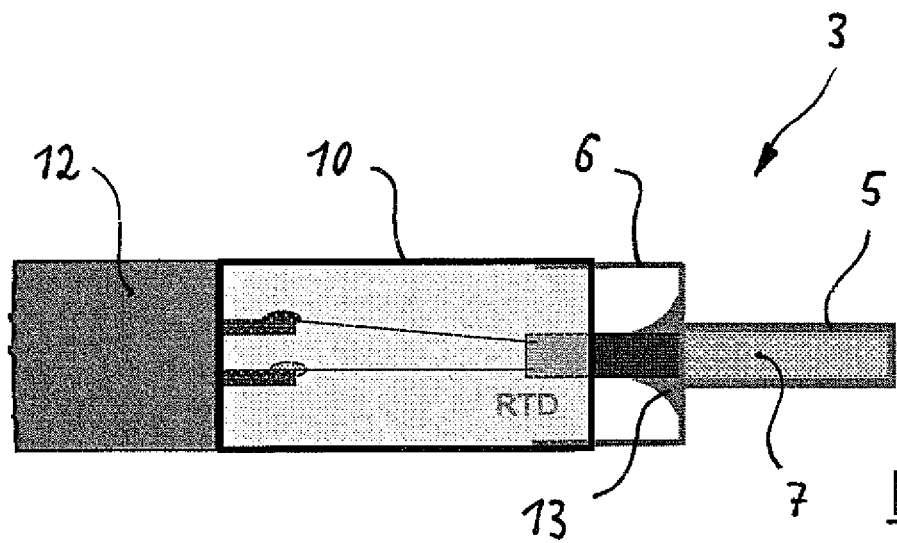
Fig. 3
Fig. 4

THERMAL MASS FLOWMETER WITH A METAL-ENCAPSULATED SENSOR SYSTEM

RELATED APPLICATION

This application claims priority under 35 U.S.C. §119 to German Patent Application No. DE 10 2010 018 947.2 filed in Germany on Apr. 30, 2010, the entire content of which is hereby incorporated by reference in its entirety.

FIELD

The present disclosure relates to a thermal mass flowmeter with a metal-encapsulated sensor system.

Exemplary embodiments of the present disclosure can be used, for example, in process installations in which the mass flow of fluid flowing through pipelines is measured for generally control-engineering reasons. Mass flowmeters are used for this purpose—for example, Coreolis mass flowmeters, magnetic-inductive mass flowmeters or thermal mass flowmeters—which are each based on a different physical principle. The present disclosure relates to the last-mentioned type of mass flowmeters, i.e., thermal mass flowmeters, which can be used to determine the gas flow in a pipeline.

BACKGROUND INFORMATION

According to the measurement principle on which the thermal mass flowmeter is based, two temperature sensors can be fitted in the media flow, which acts on them, in order to transfer heat to the media flow and to measure its temperature. In this case, resistance thermometers are primarily used as temperature sensors. The flow can be calculated from the heating power and the temperature of a heated resistance thermometer, using generally known mathematical relationships.

DE 199 39 942 A1 from the same applicant discloses a thermal mass flowmeter. This thermal mass flowmeter has a pulsed electrical heating element and a temperature sensor which is thermally operatively connected to the flowing fluid and whose electrical resistance is temperature-dependent. In this case, the sensor element can be heated by means of the heating element. Electronic means are provided in order to determine the flow and to detect the time profile of a heating and cooling process which takes place in the sensor element.

Heating elements and sensor elements are in this case accommodated in a common housing. The thermal operative connection between the sensor element and the medium flowing past is influenced by the choice of material for the housing and of a possible filling material within the housing, as well as the geometric configuration of the housing.

In the above-described thermal mass flowmeter, the housing has a taper in the area of the sensor element, in order to increase the thermal operative connection. In principle, an optimum measurement effect and high measurement accuracy can be achieved by as good a thermal operative connection as possible, that is to say a maximum heat transfer from the heating element to the flowing medium, and by minimum heat dissipation into the sensor connections or holders.

In order to achieve a sensor system with a short response time, the thermal mass of the sensor system and its packaging environment should be kept as small as possible. On the other hand, numerous industrial applications—for example, in the foodstuffs and pharmacology sectors—require metal encapsulation of the sensor system, for example, by means of stainless steel. In addition to hygienic aspects, such metal-encapsulated sensor systems have the advantage of being considerably more resistant to corrosive media, and can therefore be used even in severe environments. However, appliances such as these require complex packaging for the sensor system, since the sensor system and its packaging must be stable over a wide temperature range and numerous different materials are generally used, with different thermal coefficients of expansion.

U.S. Pat. No. 5,880,365 discloses a metal-encapsulated sensor system for a thermal mass flowmeter having a metal cap. The metal cap has a cylindrical shape and is formed by welding a hollow cylinder and a circular cover together. The ratio of the circumference to the cross section of this sensor system is a critical quality parameter. Resistance wires are used internally as sensors and are wound around a likewise cylindrical former, which is in turn surrounded by the cylindrical metal cap. In order to achieve a sensor system with a low thermal resistance, the cylindrical metal cap is in this case plastically deformed into the flowing medium. In addition, the use of a gland contributes to increased thermal insulation of the cylindrical former.

DE 102 16 532 A1 describes a metal-encapsulated sensor system in which a thermal measurement element is mounted on a rectangular ceramic mount. The ceramic mount is in turn surrounded by a cylindrical metal cap, and is fixed therein by means of solder tin. In this case, however, the electrical contact-making points of the measurement element are not covered by the solder tin. Furthermore, the ceramic mount is covered by a temperature-resistant glass layer at the location of the measurement element which is mounted on it. Tin metallization is applied to the opposite surface of the ceramic mount to the measurement element. All of these quite complex measures serve to achieve a sensor system with as low a thermal resistance as possible in the flowing medium, and great thermal insulation at the same time within the mount.

In addition, EP 1 835 267 A2 includes a measure for suppression of the heat flow between the heating resistor and its mount. A second active heating element is used for this purpose, and is positioned between the heating resistor and the mount. This type of active heat flow suppression requires a correspondingly large amount of component complexity, however.

SUMMARY

An exemplary embodiment of the present disclosure provides a thermal mass flowmeter which includes a metal-encapsulated sensor system. The sensor system includes at least one heating resistor having a platelet geometry, and a sensor cap surrounding the at least one heating resistor. The sensor cap includes at least one distal end area which has a rectangular cross section corresponding to the platelet geometry of the heating resistor, such that the distal end area of the sensor cap surrounds the heating resistor with a predetermined gap therebetween.

BRIEF DESCRIPTION OF THE DRAWINGS

Additional refinements, advantages and features of the present disclosure are described in more detail below with reference to exemplary embodiments illustrated in the drawings, in which:

FIG. 3 shows a longitudinal section through the sensor cap shown in FIG. 2; and

FIG. 4 shows a longitudinal section through a sensor cap which has been additionally lengthened by a cylindrical bush according to an exemplary embodiment of the present disclosure.

DETAILED DESCRIPTION

Figure 1:
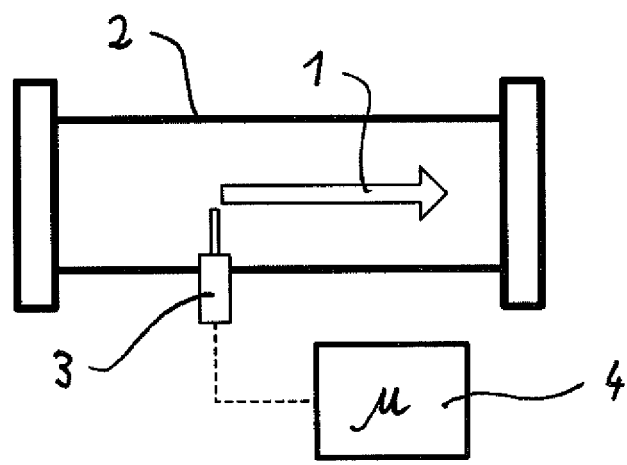
FIG. 1 shows a schematic illustration of a thermal mass flowmeter with a metal-encapsulated sensor system according to an exemplary embodiment of the present disclosure.

Exemplary embodiments of the present disclosure provide a thermal mass flowmeter with a stable metal-encapsulated sensor system which ensures an optimum measurement effect with very high accuracy by simple technical measures. According to an exemplary embodiment, the thermal mass flowmeter includes at least one heating resistor which has a platelet geometry and which is surrounded by a sensor cap.

According to an exemplary embodiment, at least one distal end area of the sensor cap is formed with a rectangular cross section corresponding to a platelet geometry of the heating resistor, such that distal end of the sensor cap surrounds the heating resistor closely with an accurate fit (e.g., with a minimal predetermined gap therebetween).

According to the above-described arrangement of the present disclosure, the heat transfer from the sensor system into the flowing medium is significantly improved by these specific geometric relationships, with only a minimal amount of heat being dissipated into the sensor connections at the same time, since the sensor cap surrounds only the distal end area of the heating resistor with a correspondingly accurate fit. The above-described arrangement according to the present disclosure minimizes the thermal mass of the sensor system and its packaging.

According to an exemplary embodiment, a thin-film resistor can be used for the sensor system, which is applied to a likewise thin substrate which has the platelet geometry, in order to locally separate the heating surface and the contact connections. Since the exemplary embodiments according to the present disclosure minimize the thermal mass of the sensor system and its sensor cap which provides good resistance, this arrangement allows for an advantageously short response time to be achieved. In comparison to a conventional cylindrical housing geometry, the rectangular profiling according to the present disclosure doubles the quality factor which represents the ratio of the circumference to the cross section. For example, the large cooling area of the rectangular profiling, in comparison to its volume, results in the desired short response time and the optimum measurement effect in terms of sensitivity. Experimental trials have shown that the response time of the sensor system according to the present disclosure can be reduced from 1 to 3 s to about 0.6 s in comparison to conventional solutions. Because of the rectangular cross section of the sensor cap, large parts of the surface of the housing form a uniform structure, thus making it possible to form a uniform flow structure here as well. Furthermore, the separation of the flow is shifted from the surface to the rear edge area. This area is small because of the specific shape according to exemplary embodiments of the present disclosure, and therefore has only a minor influence on the total heat transfer. Instabilities in this area therefore have only a minor influence on the measurement characteristics.

For this reason, the exemplary sensor system according to the present disclosure can be described by a simple analytical equation with only a small number of parameters to be calibrated. Therefore, only a small number of measurement points are required for calibration, which likewise assists the measurement accuracy.

According to an exemplary embodiment, the flat-cuboid distal end area of the sensor cap is comprised of a 0.1 to 0.3 mm thick metal sheet which surrounds the heating resistor while ensuring a gap of a maximum of 0.1 mm. With this metal sheet thickness range, the sensor cap provides an adequate protection function for the internal sensor system for most applications, and this results in good heat transfer into the flowing medium because of the very narrow gap between it and the sensor cap. Overall, a fit accuracy is achieved which results in the short response time mentioned above.

According to an exemplary embodiment, the heating resistor which is used for the sensor system is comprised of a flat-cuboid substrate platelet with a thin-film resistor applied to it. A thin-film resistor such as this can be accommodated in a particularly space-saving manner within the rectangular cross section of the sensor cap.

According to an exemplary embodiment, the edges of the flat-cuboid distal end area of the sensor cap are particularly sharp, for example, with a radius or a chamfer of a maximum of approximately one-third of the width b of the sensor cap. This arrangement avoids a circular incident-flow front on the sensor cap, for efficient heat transfer. The particularly sharp-edged configuration of the sensor cap in the distal end area results in flow separations at these edges largely independently of the respective environmental parameters, which therefore do not change their position on the surface. This allows considerably more stable flow conditions to be achieved than in the case of conventional sensor caps, which additionally simplifies the calibration and improves the accuracy of the mass flow measurement.

According to an exemplary embodiment, the flat-cuboid shaped, e.g., sharp-edged, distal end area of the sensor cap continues in the axial direction into a connecting area which widens in comparison to the end area, in order to accommodate the electrical connecting means for the heating resistor therein.

According to an exemplary embodiment, electrical cables can be attached to the ends of the heating resistor by a soldered joint. The shape of the sensor cap according to the present disclosure can therefore be strictly based on the function of the sensor system. While the distal end area is designed to achieve an accurate measurement result, the rest of the area of the sensor cap can be designed to have a shape such that sufficient space is provided to accommodate the electrical connecting means. In particular, the widened connecting area may be cylindrical for this purpose.

The sensor cap, which is composed of the thin metal sheet, can be produced by bending and sealed soldering of metal sheet, by deep drawing or else by shaping, for example.

The widened end area of the sensor cap should preferably be provided with a gas filling. The gas filling is used for thermal insulation of the sensor system from a holder rod to which the sensor cap is fitted. The gas reduces the thermal conductivity by about one order of magnitude.

In this case, the gas-filled cavity formed in this way should be designed to be as physically long as possible, in order to achieve a high insulation effect.

According to an exemplary embodiment, the gas-filled widened end area can have a greater longitudinal extent than lateral extent and can be formed by an additional cylindrical bush, which is welded onto the sensor cap at the end and is in turn fixed at one end to the mount bar. This type of thermal insulation of the sensor system reduces measurement errors resulting from heat dissipation into the holder bar, which is normally not constant, and therefore cannot be compensated for by calibration of the sensor system either. Since the heat dissipation into the holder bar depends on the temperature of the flowing medium and the ambient temperature, fluctuations can result in a significant measurement error, which is therefore prevented by the thermal insulation. In this case, the thermal insulation can be adjusted by varying the bush length and its wall thickness. The heat loss can be reduced by a factor of 4 to 6 in this way, by doubling the bush length and therefore the length of the cavity.

An important measurement variable of the sensor system is the heat transfer from the surface of the sensor cap into the flowing medium. Since the heating power, the sensor surface temperature and the medium temperature are known, the heat transfer and, in the end, the flow rate can be determined using the generally known mathematical relationships. While the heating power and the medium temperature can be determined easily by measurement, the surface temperature of the sensor cap can be determined from the temperature of the heating resistor in the interior of the sensor system, assuming a constant thermal resistance from the heating resistor to the sensor surface. Changes in the thermal resistance cause measurement errors, which are proportional to the change in the thermal resistance. This problem of known thermal mass flowmeters with complex sensor system packaging is solved in principle by exemplary embodiments of the present disclosure, as described in greater detail below, in that potential measurement errors are reduced by minimizing the thermal resistance of this packaging.

With regard to the accurately fitting thin-walled sensor cap, the narrow gap between it and the heating resistor can be filled with a solid, liquid or pasty filler of high thermal conductivity. In addition to the measure of keeping the gap between the heating resistor and the sensor cap small, such embedding into a highly thermally conductive filler makes it possible to additionally reduce the thermal resistance of the packaging for the sensor system. In addition to this reduction and stabilization of the thermal resistance, the filler also ensures a robust mechanical connection between the heating resistor and the sensor cap.

Exemplary embodiments of the present disclosure will now be described in more detail in the following text with reference to the drawings.

FIG. 1 illustrates a thermal mass flowmeter according to an exemplary embodiment of the present disclosure. As shown in FIG. 1, a sensor cap 3 of a metal-encapsulated sensor system for a thermal mass flowmeter is arranged in a pipeline 2 through which a flowing medium 1 flows. According to the illustrated exemplary embodiment, the sensor cap 3 is arranged in the pipeline 2 such that the flowing medium 1 flows around the sensor cap 3. This metal-encapsulated sensor system is electrically connected to an electronic evaluation unit 4 for monitoring and/or analyzing values measured at the sensor cap 3, for example.

Figure 2:
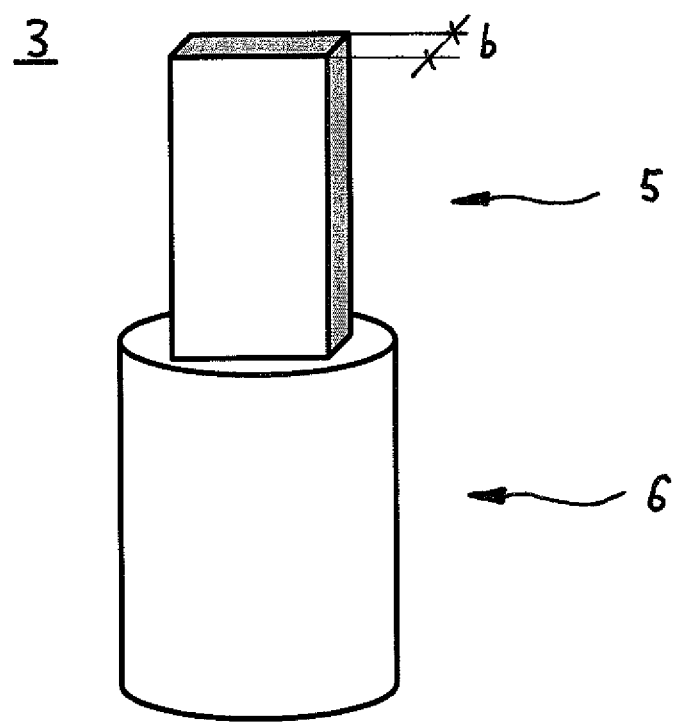
FIG. 2 shows a perspective illustration of a sensor cap according to an exemplary embodiment of the present disclosure.

As shown in FIG. 2, the sensor cap 3 has a distal end area 5 with a substantially flat-cuboid cross section, which continues in a widened connecting area 6, which is cylindrical. According to an exemplary embodiment, this integrally manufactured sensor cap 3 is comprised of a 0.2 mm thick metal sheet, for example, in order to protect the internal sensor system against the medium 2 flowing around the sensor cap 3.

As shown in FIG. 3, the sensor cap 3 contains a heating resistor 7 which has a platelet geometry. The distal end area 5 of the sensor cap 3 is in this case formed with a rectangular cross section such that the distal end area 5 closely surrounds the heating resistor 7 with an accurate fit, such that a predetermined minimal gap 8 between the distal end area 5 of the sensor cap 3 and the heating resistor 7. The gap 8 between the heating resistor 7 and the distal end area 5 of the sensor cap 3 is narrow, of less than 0.1 mm, for example.

According to an exemplary embodiment, the heating resistor 7 is comprised of a flat-cuboid substrate platelet with a thin-film resistor 9 applied to it. For electrical connection of the thin-film resistor 9, the sensor cap 3 has a connecting area 6 which is wider than the distal end area 5 and in which the ends of the thin-film resistor 9 are soldered to electrical connecting cables 11.

According to an exemplary embodiment illustrated in FIG. 4, the cylindrical connecting area 6 of the sensor cap 3 can be lengthened at the end by a cylindrical bush 10 which is welded to it. The cylindrical bush 10 is filled with a gas for thermal insulation of the heating resistor 7 from a holder bar 12. The gap 8 between the flat-cuboid distal end area 5 of the sensor cap 3 and the heating resistor 7 is filled with a pasty filler 13 of high thermal conductivity, which is also used at the same time to fix the heating resistor 7 relative to the sensor cap 3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Flowing medium
2 Pipeline
3 Sensor cap
4 Evaluation unit
5 Distal end area
6 Widened connecting area
7 Heating resistor
8 Gap
9 Thin-film resistor
10 Cylindrical bush
11 Electrical connecting cable
12 Holding bar
13 Filler
b Width of the sensor cap

What is claimed is:

1. A thermal mass flowmeter comprising:
a metal-encapsulated sensor system which includes at least one heating resistor having a platelet geometry, and a sensor cap surrounding the at least one heating resistor, wherein the sensor cap includes at least one distal end area which has a first rectangular shape and cross section corresponding to the platelet geometry of the heating resistor, such that the distal end area of the sensor cap surrounds the heating resistor with a predetermined gap therebetween, and a connecting area into which the heating resistor extends from the distal end area such that the heating resistor extends entirely between the distal end area and the connecting area of the sensor cap, the connecting area having a second shape and cross section different from the first shape and cross section of the distal end area.

2. The thermal mass flowmeter as claimed in claim 1, wherein the distal end area of the sensor cap has a flat-cuboid shape and is comprised of a 0.1 to 0.3 mm thick metal sheet which surrounds the heating resistor while ensuring that the predetermined gap is a maximum of 0.1 mm.

3. The thermal mass flowmeter as claimed in claim 2, wherein the heating resistor is comprised of a flat-cuboid substrate platelet with a thin-film resistor applied thereto.

4. The thermal mass flowmeter as claimed in claim 3, wherein edges of the flat-cuboid distal end area of the sensor cap have a radius or a chamfer of a maximum of ⅓ of the width of the sensor cap.

5. The thermal mass flowmeter as claimed in claim 4, wherein the flat-cuboid distal end area of the sensor cap continues in the axial direction into the connecting area which is wider than the end area and in which the heating resistor is connected via electrical cables, by means of a soldered joint.

6. The thermal mass flowmeter as claimed in claim 5, wherein the widened connecting area is cylindrical.

7. The thermal mass flowmeter as claimed in claim 5, wherein the widened connecting area is gas-filled.

8. The thermal mass flowmeter as claimed in claim 7, wherein the gas-filled widened end area has a greater longitudinal extent than lateral extent.

9. The thermal mass flowmeter as claimed in claim 5, wherein the widened connecting area of the sensor cap is lengthened at a portion to which a cylindrical bush is welded.

10. The thermal mass flowmeter as claimed in claim 3, wherein the gap between the distal end area f the sensor cap and the heating resistor is filled with at least one of a solid, liquid and pasty filler of high thermal conductivity.

11. The thermal mass flowmeter as claimed in claim 1, wherein the heating resistor is comprised of a flat-cuboid substrate platelet with a thin-film resistor applied thereto.

12. The thermal mass flowmeter as claimed in claim 1, wherein the distal end area of the sensor cap has a flat-cuboid shape, and edges of the flat-cuboid distal end area of the sensor cap have a radius or a chamfer of a maximum of ⅓ of the width of the sensor cap.

13. The thermal mass flowmeter as claimed in claim 1, wherein the distal end area of the sensor cap has a flat-cuboid shape, and the flat-cuboid distal end area of the sensor cap continues in the axial direction into the connecting area which is wider than the end area and in which the heating resistor is connected via electrical cables, by means of a soldered joint.

14. The thermal mass flowmeter as claimed in claim 13, wherein the widened connecting area is cylindrical.

15. The thermal mass flowmeter as claimed in claim 13, wherein the widened connecting area is gas-filled.

16. The thermal mass flowmeter as claimed in claim 15, wherein the gas-filled widened end area has a greater longitudinal extent than lateral extent.

17. The thermal mass flowmeter as claimed in claim 13, wherein the widened connecting area of the sensor cap is lengthened at a portion to which a cylindrical bush is welded.

18. The thermal mass flowmeter as claimed in claim 1, wherein the gap between the distal end area of the sensor cap and the heating resistor is filled with at least one of a solid, liquid and pasty filler of high thermal conductivity.

\* \* \* \* \*